(12) United States Patent
Chromcak

(10) Patent No.: US 12,388,371 B2
(45) Date of Patent: Aug. 12, 2025

(54) SWITCHING POWER CONVERTERS, AND METHODS AND PRIMARY-SIDE CONTROLLERS FOR CONTROLLING SAME

(71) Applicant: SEMICONDUCTOR COMPONENTS INDUSTRIES, LLC, Scottsdale, AZ (US)

(72) Inventor: Jan Chromcak, Roznov pod Radhostem (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 282 days.

(21) Appl. No.: 18/322,994

(22) Filed: May 24, 2023

(65) Prior Publication Data

US 2024/0396457 A1 Nov. 28, 2024

(51) Int. Cl.
*H02M 3/335* (2006.01)
*H02M 1/00* (2006.01)

(52) U.S. Cl.
CPC ..... *H02M 3/33523* (2013.01); *H02M 1/0025* (2021.05)

(58) Field of Classification Search
CPC .............. H02M 1/0025; H02M 3/335; H02M 3/33507; H02M 3/33515; H02M 3/33523; H02M 3/33538; H02M 3/33546; H02M 3/33553; H02M 3/33569
See application file for complete search history.

(56) References Cited

U.S. PATENT DOCUMENTS

| 6,529,049 B2 | 3/2003 | Erhart et al. |
| 8,213,192 B2 | 7/2012 | Konecny et al. |
| 9,954,446 B2 * | 4/2018 | Fang ................. H02M 3/33515 |

(Continued)

FOREIGN PATENT DOCUMENTS

| CN | 106849667 A | 6/2017 |
| CN | 108183615 A | 6/2018 |

OTHER PUBLICATIONS

Gatti, U, et al., "An Accurate CMOS Sample-and-Hold Circuit", Solid State Circuits, vol. 27, No. 1, Jan. 1993, 3 pages.

(Continued)

*Primary Examiner* — Alex Torres-Rivera
(74) *Attorney, Agent, or Firm* — Dickinson Wright PLLC

(57) ABSTRACT

Switching power converters, and methods and primary-side controllers for controlling same. One example is a method of controlling a switching power converter, the method comprising: asserting drive signals applied to a primary switch during a plurality of switching periods; during a first switching period, controlling assertion of a first drive signal based on a sample held by a first capacitor, sampling instantaneous output voltage with a second capacitor, and pre-charging a third capacitor; during a second switching period, controlling assertion of a second drive signal based on a sample held by the second capacitor, sampling instantaneous output voltage with the third capacitor, and pre-charging the first capacitor; and during a third switching period, controlling assertion of a third drive signal based on a sample held by the third capacitor, sampling instantaneous output voltage with the first capacitor, and pre-charging the second capacitor.

20 Claims, 5 Drawing Sheets

(56) References Cited

U.S. PATENT DOCUMENTS

| | | | | |
|---|---|---|---|---|
| 2015/0003121 A1* | 1/2015 | Yang | ................ | H02M 3/33523 |
| | | | | 363/21.17 |
| 2021/0226527 A1* | 7/2021 | Pasqua | ................ | H02M 1/4225 |
| 2022/0094270 A1* | 3/2022 | Finkel | ............... | H02M 3/33523 |

OTHER PUBLICATIONS

Semiconductor Components Industries, LLC, "Low Power Offline Constant Current & Constant Voltage Primary Side PWM Current-Mode Controller with/without High Voltage Startup Current Source", NCP1360/D, Rev. 3, Jun. 2016, 29 pages.

German Search Report completed Mar. 6, 2024 for German Application No. 102023121264.8, 8 pages.

\* cited by examiner

SWITCHING POWER CONVERTERS, AND METHODS AND PRIMARY-SIDE CONTROLLERS FOR CONTROLLING SAME

CROSS-REFERENCE TO RELATED APPLICATIONS

Not Applicable.

BACKGROUND

Switching power converters can be used to create a direct current (DC) output by switching current through an energy storage element, such as a transformer. The duty cycle and/or frequency of the switching are controlled to regulate the output voltage to a desired level. One popular type switching power converter is a flyback converter.

A flyback converter uses a transformer as the energy storage element, and the transformer is arranged for flyback operation. When a primary switch is made conductive, current in the primary winding of the transformer stores energy in the field of the transformer. When the primary switch is made non-conductive, a voltage is induced on the secondary winding that forward biases a secondary rectifier. The secondary winding supplies voltage and current to the load as the field around the transformer collapses. A controller varies the on- and off-times of the primary switch to regulate the output voltage.

Some switching power converters arranged for flyback operation indirectly sense the output voltage by way of an auxiliary winding of the transformer. In light load conditions, it may be difficult to sense the output voltage because discharge modes of the transformer may be very short.

SUMMARY

At least one example is a method of controlling a switching power converter, the method comprising: asserting drive signals applied to a primary electrically-controlled switch during a plurality of switching periods; during a first switching period, controlling a duration of assertion of a first drive signal based on a sample held by a first capacitor, sampling a voltage indicative of instantaneous output voltage with a second capacitor, and pre-charging a third capacitor; during a second switching period, controlling a duration of assertion of a second drive signal based on a sample held by the second capacitor, sampling a voltage indicative of instantaneous output voltage with the third capacitor, and pre-charging the first capacitor; and during a third switching period, controlling a duration of assertion of a third drive signal based on a sample held by the third capacitor, sampling a voltage indicative of instantaneous output voltage with the first capacitor, and pre-charging the second capacitor.

In the example method: sampling the voltage indicative of instantaneous output voltage during the first switching period may further comprise driving the second capacitor with a sample amplifier; and pre-charging the third capacitor during the first switching period may further comprise pre-charging with a pre-charge amplifier.

In the example method: sampling the voltage indicative of instantaneous output voltage during the second switching period may further comprise driving the third capacitor with the sample amplifier; and pre-charging the first capacitor during the second switching period may further comprise pre-charging with the pre-charge amplifier. Sampling the voltage indicative of instantaneous output voltage during the third switching period may further comprise driving the first capacitor with the sample amplifier; and pre-charging the second capacitor during the third switching period may further comprise pre-charging with the pre-charge amplifier.

The example method may further comprise, during the first switching period: during a charge mode of the first switching period, coupling the first capacitor to a sample input of a sample amplifier and a pre-charge input of a pre-charge amplifier; and during a discharge mode of the first switching period, coupling the voltage indicative of instantaneous output voltage to the sample input of the sample amplifier and the pre-charge input of the pre-charge amplifier. The method may further comprise, during the second switching period: during a charge mode of the second switching period, coupling the second capacitor to the sample input of the sample amplifier and the pre-charge input of the pre-charge amplifier; and during a discharge mode of the second switching period, coupling the voltage indicative of instantaneous output voltage to the sample input of the sample amplifier and the pre-charge input of the pre-charge amplifier. The method may further comprise, during the third switching period: during a charge mode of the third switching period, coupling the third capacitor to the sample input of the sample amplifier and the pre-charge input of the pre-charge amplifier; and during a discharge mode of the third switching period, coupling the voltage indicative of instantaneous output voltage to the sample input of the sample amplifier and the pre-charge input of the pre-charge amplifier.

Another example is a primary-side controller for a switching power converter, the primary-side controller comprising: a ZCD terminal and a drive terminal; a driver coupled to the drive terminal and defining a drive input; a latch defining a drive output coupled to drive input, a set input, and a reset input; a voltage regulator defining a set output coupled to the set input, a reset output coupled to the reset input, and a feedback input, the voltage regulator configured to periodically assert the drive terminal by assertion of the set output to cause charge modes, and to end each charge mode by assertion of the reset output based on a feedback signal on the feedback input; and a sample controller comprising a first capacitor, a second capacitor, and a third capacitor, the sample controller coupled to the ZCD terminal and defining a feedback output. The sample controller may be configured to: during a first switching period of a drive signal applied to the drive terminal, supply the feedback signal to the voltage regulator with the first capacitor, sample a voltage on the ZCD terminal with the second capacitor, and pre-charge the third capacitor; during a second switching period of the drive signal applied to the drive terminal, supply the feedback signal to the voltage regulator with the second capacitor, sample a voltage on the ZCD terminal with the third capacitor, and pre-charge the first capacitor; and during a third switching period of the drive signal applied to the drive terminal, supply the feedback signal to the voltage regulator with the third capacitor, sample a voltage on the ZCD terminal with the first capacitor, and pre-charge the second capacitor.

The example primary-side controller may further comprise: a pre-charge amplifier defining a pre-charge output; a pre-charge switch configured to selectively couple the pre-charge output to the first, second, or third capacitor; a sample amplifier defining a sample output; a sample switch configured to selectively couple the sample output to the first, second, or third capacitor; and a feedback switch configured to selectively couple the first, second, or third capacitor to the feedback output. The sample controller may be configured to, during the first switching period: arrange the feedback switch to couple the first capacitor to the feedback output; arrange the sample switch to couple the second capacitor to the sample amplifier; and arrange the pre-charge switch to couple the third capacitor to the pre-charge amplifier. The sample controller may be further configured to, during the second switching period: arrange the feedback switch to couple the second capacitor to the feedback output; arrange the sample switch to couple the third capacitor to the sample amplifier; and arrange the pre-charge switch to couple the first capacitor to the pre-charge amplifier.

In the example primary-side controller, the sample controller may be further configured to, during the third switching period: arrange the feedback switch to couple the third capacitor to the feedback output; arrange the sample switch to couple the first capacitor to the sample amplifier; and arrange the pre-charge switch to couple the second capacitor to the pre-charge amplifier.

In the example primary-side controller, the sample controller may further comprise: a pre-charge amplifier defining a pre-charge input; a sample amplifier defining a sample input; an input switch configured to selectively couple the pre-charge input and the sample input to the feedback output or the ZCD terminal. The sample controller may be further configured to, during the first switching period: during a charge mode of the first switching period, arrange the input switch to couple the feedback signal to the sample input of the sample amplifier and the pre-charge input of the pre-charge amplifier; and during a discharge mode of the first switching period, arrange the input switch to couple the ZCD terminal to the sample input of the sample amplifier and the pre-charge input of the pre-charge amplifier. The sample controller may be further configured to, during the second switching period: during a charge mode of the second switching period, arrange the input switch to couple the feedback signal to the sample input of the sample amplifier and the pre-charge input of the pre-charge amplifier; and during a discharge charge mode of the second switching period, arrange the input switch to couple the ZCD terminal to the sample input of the sample amplifier and the pre-charge input of the pre-charge amplifier. The sample controller may be further configured to, during the third switching period: during a charge mode of the third switching period, arrange the input switch to couple the feedback signal to the sample input of the sample amplifier and the pre-charge input of the pre-charge amplifier; and during a discharge mode of the third switching period, arrange the input switch to couple the ZCD terminal to the sample input of the sample amplifier and the pre-charge input of the pre-charge amplifier.

The example primary-side controller may further comprise a current-sense terminal, and wherein the voltage regulator ends each charge mode based on the feedback signal on the feedback input and a current-sense signal on the current-sense terminal.

Yet another example is a switching power converter comprising: a transformer having a primary winding defining a first terminal and a second terminal, a secondary winding defining third terminal and fourth terminal, and an auxiliary winding defining a fifth terminal and a sixth terminal, the first terminal coupled to an input voltage, the fourth terminal defining a secondary return, and the sixth terminal coupled to a reference voltage; an electrically-controlled switch having a first lead coupled to the second terminal, a second lead coupled to the reference voltage, and a control input; a secondary rectifier having a first lead coupled to the third terminal and a second lead defining an output voltage; and a controller coupled to the auxiliary winding and the control input of the electrically-controlled switch. The controller may be configured to: assert the control input during a plurality of switching periods; during a first switching period, control a duration of assertion of a first drive signal based on a sample held by a first capacitor, sample a voltage on the auxiliary winding with a second capacitor, and pre-charge a third capacitor; during a second switching period, control a duration of assertion of a second drive signal based on a sample held by the second capacitor, sample a voltage on the auxiliary winding with the third capacitor, and pre-charge the first capacitor; and during a third switching period, control a duration of assertion of a third drive signal based on a sample held by the third capacitor, sample a voltage on the auxiliary winding with the first capacitor, and pre-charge the second capacitor.

In the example switching power converter: when the controller samples the voltage on the auxiliary winding during the first switching period, the controller may be configured to drive the second capacitor with a sample amplifier; and when the controller pre-charges the third capacitor during the first switching period, the controller may be configured to pre-charge with a pre-charge amplifier. In the example switching power converter: when the controller samples the voltage on the auxiliary winding during the second switching period, the controller may be configured to drive the third capacitor with the sample amplifier; and when the controller pre-charges the first capacitor during the second switching period, the controller may be configured to pre-charge with the pre-charge amplifier. In the example switching power converter: when the controller samples the voltage on the auxiliary winding during the third switching period, the controller may be configured to drive the first capacitor with the sample amplifier; and when the controller pre-charges the second capacitor during the third switching period, the controller may be configured to pre-charge with the pre-charge amplifier.

In the example switching power converter, the controller may be further configured to, during the first switching period: couple, during a charge mode of the first switching period, the first capacitor to a sample input of a sample amplifier and a pre-charge input of a pre-charge amplifier; and couple, during a discharge mode of the first switching period, auxiliary winding to the sample input of the sample amplifier and the pre-charge input of the pre-charge amplifier. The controller may be further configured to, during the second switching period: couple, during a charge mode of the second switching period, the second capacitor to the sample input of the sample amplifier and the pre-charge input of the pre-charge amplifier; and couple, during a discharge mode of the second switching period, the auxiliary winding to the sample input of the sample amplifier and the pre-charge input of the pre-charge amplifier. The controller may be further configured to, during the third switching period: couple, during a charge mode of the third switching period, the third capacitor to the sample input of the sample amplifier and the pre-charge input of the pre-charge amplifier; and couple, during a discharge mode of the third switching period, an auxiliary winding to the sample input of the sample amplifier and the pre-charge input of the pre-charge amplifier.

BRIEF DESCRIPTION OF THE DRAWINGS

For a detailed description of example embodiments, reference will now be made to the accompanying drawings in which.

DEFINITIONS

Figure 1:
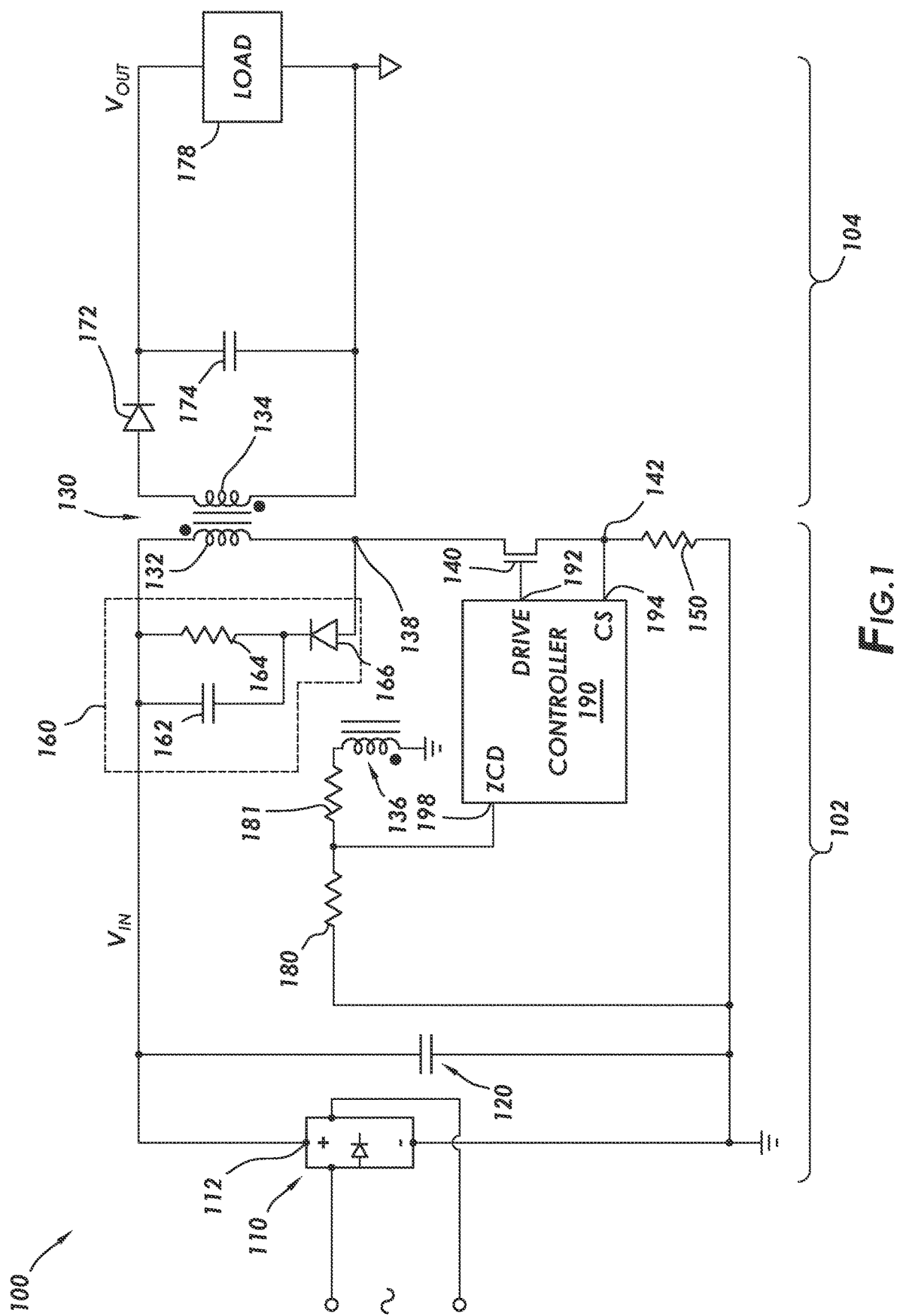
FIG. 1 shows a partial schematic and a partial block diagram of a power converter, in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in relation to a recited value shall mean the recited value plus or minus (+/−) ten percent of the recited value.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean creating or maintaining a first predetermined state of a Boolean signal. Boolean signals may be asserted high or with a higher voltage, and Boolean signals may be asserted low or with a lower voltage, at the discretion of the circuit designer. Similarly, "de-assert" shall mean creating or maintaining a second predetermined state of the Boolean, opposite the asserted state.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to switching power converters, and methods and primary-side controllers for operating switching power converters. In particular, various examples are directed to switching power converters with transformers arranged for flyback operation, and where the primary-side controller indirectly senses output voltage $V_{OUT}$ by way of an auxiliary winding of the transformer. More particularly still, various examples are directed to a primary-side controller that samples a voltage indicative of output voltage by way of the auxiliary winding in light load conditions when the discharge modes of the transformer are short (e.g., 460 nanoseconds (ns) or less, in some cases 250 ns or less, and in other cases as short as about 125 ns). Yet more particularly still, various examples utilize sample capacitors to sample the voltage indicative of output voltage by way of the auxiliary winding, the sampling and use being a three step process: a capacitor is reset and pre-charged in a first switching period; the capacitor is used to sample the voltage indicative of output voltage in a second switching period; and the capacitor holds the sampled value as a feedback signal during a third switching period. By using three capacitors, during each switching period there is one capacitor holding a sample from a previous switching period to be used as feedback voltage for voltage regulation, another capacitor is sampling the voltage indicative of output voltage, and another capacitor is reset and pre-charged in preparation for sampling. The specification turns to an example system to orient the reader.

FIG. 1 shows a partial schematic and a partial block diagram of an example power converter 100. In particular, the power converter 100 comprises a primary side 102 galvanically isolated from a secondary side 104 by way of a transformer 130. The example primary side 102 comprises rectifier 110, an input capacitor 120, a primary winding 132 of the transformer 130, a primary field effect transistor (primary FET 140), a sense resistor 150, and a controller 190. The example secondary side 104 comprises a secondary winding 134 of the transformer 130, a secondary rectifier in the example form of a diode 172, an output capacitor 174, and an example load 178.

Turning first to the primary side 102. The rectifier 110, illustrated in block diagram form, includes an arrangement of one or more diodes in a configuration that rectifies an alternating current (AC) supply. The rectifier 110 produces a rectified waveform at the DC node 112. For example, the rectifier 110 may provide a full-wave rectified waveform and the input capacitor 120 smooths the waveform. Thus, the rectifier 110 provides a DC input voltage to the primary side 102, the DC input voltage hereafter referred to as the input voltage VIN. In other examples, the rectifier 110 may be omitted, and other upstream devices (e.g., an upstream power converter) may provide the input voltage VIN to the power converter 100.

The example transformer 130 comprises the primary winding 132, the secondary winding 134, and an auxiliary winding 136. The primary winding 132 has a first lead or terminal coupled to a DC node 112, and a second lead or terminal that defines a switch node 138. The switch node 138 is coupled to the drain of the primary FET 140, and the source of the primary FET 140 is coupled to common or ground on the primary side 102 by way the sense resistor 150. The source of the primary FET 140 defines a current-sense node 142. In the example power converter 100, the primary FET 140 is shown as an N-channel MOSFET. However, in other examples, the primary FET 140 may be a P-channel MOSFET, or any other suitable device that operates as an electrically-controlled switch, such as FETs referred to as "super-junction" (SJFETs), and gallium nitride (GaN) FETs.

The example power converter 100 further comprises a snubber circuit 160 comprising a capacitor 162, a resistor 164, and a diode 166. The capacitor 162 has a first lead coupled to the DC node 112, and a second lead. The resistor 164 has a first lead coupled to the DC node 112 and a second lead coupled to the second lead of the capacitor 162. The diode 166 has an anode coupled to the switch node 138, and a cathode coupled to the capacitor 162 and the resistor 164. At the end of each charge mode (discussed more below), current from the primary winding 132 caused by leakage inductance of the transformer 130 may be snubbed into the snubber circuit 160. The example snubber circuit 160 is a passive snubber in the sense that the controller 190 does not control activation of the rectifier of the snubber circuit 160. In other examples, the snubber circuit 160 may be an active snubber circuit, and thus the diode 166 may be replaced with an electrically-controlled switch, such as a FET.

Still referring to FIG. 1, the example primary side 102 comprises the controller 190. The controller 190 defines a plurality of electrical terminals, including a drive terminal 192 coupled to the control input or gate of the primary FET 140, a current-sense terminal (CS terminal 194) coupled to a current-sense node 142, and zero-crossing or zero-current detect terminal (ZCD terminal 198). Additional terminals may be present, such as a Vcc terminal used to supply power to the controller 190, a ground terminal, and a high-voltage terminal coupled to the input voltage VIN, but such additional terminals are not shown so as not to unduly complicate the figure and the discussion.

The ZCD terminal 198 is coupled to the auxiliary winding 136 by way of a voltage divider comprising resistors 180 and 181. For example, the resistors 180 and 181 may be selected such that the voltage at the node between the resistors 180 and 181 is ¹/₁₀th of the voltage at the first connection or lead of the auxiliary winding 136. During periods of time in which the primary FET 140 is non-conductive (e.g., the discharge mode), the voltage on the auxiliary winding 136 is a scaled version of the voltage on the switch node 138, and thus the controller 190 may implement resonant valley detection by way of the ZCD terminal 198. As will be discussed in greater detail below, the example controller 190 also senses a signal indicative of output voltage by way of the ZCD terminal 198. Thus, the example power converter 100 need not include an optocoupler to directly sense the output voltage $V_{OUT}$ and to provide a signal indicative of the output voltage to the controller 190. It follows, the example controller 190 performs primary-side regulation.

Turning now the secondary side 104. The example secondary winding 134 has a first lead or terminal, and a second lead or terminal defining a common or return on the secondary side 104. The first lead is coupled to a secondary rectifier illustratively shown as the diode 172. In particular, the first lead is coupled to the anode of the diode 172, and the cathode of the diode 172 is coupled to and defines the output voltage $V_{OUT}$. The example secondary side 104 thus implements passive rectification by way of diode 172. However, in other cases the diode 172 may be replaced with an active, synchronous rectifier controlled by a controller, such as a dedicated SR driver disposed electrically on the secondary side 104, or by way of the controller 190. Moreover, the secondary rectifier may be placed at any suitable location, such as between the common connection on the secondary side 104 and the second lead of the secondary winding 134. The output capacitor 174 has a first lead coupled output voltage $V_{OUT}$ and a second lead coupled to the common on the secondary side 104.

A switching cycle of the power converter 100, being one switching period, may be conceptually divided into two portions or two modes—a charge mode and a discharge mode. The charge mode begins when the controller 190 asserts the drive terminal 192 coupled to the gate of the primary FET 140. The primary FET 140 becomes conductive and enables current to flow through the primary winding 132, through the primary FET 140, and through the sense resistor 150 to ground on the primary side 102. Because of the inductive aspects of the primary winding 132, the current ramps upward over time. The current in the primary winding 132 induces a voltage on the secondary winding 134 and the auxiliary winding 136. In the case of the transformer 130 arranged for flyback operation as shown, during the charge mode the voltage on the secondary winding 134 (in conformance with the dot convention) reverse biases the diode 172. Also during the charge mode, the voltage on the auxiliary winding 136 goes negative (again in conformance with the dot convention). Because the secondary rectifier in the form of the diode 172 is reverse biased during the charge mode, no current flows in the secondary winding 134, and energy is stored in field of the transformer 130.

In some examples, the controller 190 implements current-mode control during each charge mode to control the output voltage $V_{OUT}$. In particular, in some examples the controller 190 ends each charge mode at a peak current through the primary winding 132. In FIG. 1, the current through the primary winding 132 in each charge mode is sensed as a voltage at the current-sense node 142; however, the current may be sensed at any suitable location (e.g., as voltage at the switch node 138) and in any suitable form (e.g., using a current transformer, Hall-effect current sensor). When the power converter 100 is providing power above a threshold amount (e.g., above about 30% of the full power load rating of the power converter 100), the current setpoint in each charge mode is based on a difference between a setpoint voltage and the output voltage $V_{OUT}$ of the power converter. It follows that, if output voltage $V_{OUT}$ is low, the current setpoint for a particular charge mode is higher, and if output voltage $V_{OUT}$ is high, the current setpoint for a particular charge mode is lower. The charge mode ends when the current through the primary winding 132 reaches the current setpoint, and the gate of the primary FET 140 is de-asserted making the primary FET 140 non-conductive.

In yet still other cases, the controller 190 may implement voltage-mode control. In voltage-mode control, a feedback signal indicative of the output voltage $V_{OUT}$ sets the slope of a ramp signal. During each charge mode, when the ramp signal crosses a setpoint voltage, the charge mode ends. If the output voltage $V_{OUT}$ is high, the slope of the ramp signal is greater and thus the ramp signal crosses the setpoint voltage more quickly, making the charge modes shorter. Oppositely, if the output voltage $V_{OUT}$ is low, the slope of the ramp signal is lower and thus the ramp signal crosses the setpoint voltage more slowly, making the charge modes longer.

Regardless of the use of current-mode control or voltage-mode control for ending the charge modes, the discharge mode begins when the primary FET 140 becomes non-conductive. When the primary FET 140 becomes non-conductive, the voltage on the secondary winding 134 reverses polarity, forward biasing the secondary rectifier and providing voltage and current to the output capacitor 174 and the load 178. The secondary winding 134 continues to provide voltage and current as the field associated with the transformer 130 collapses. At some point during the discharge mode, the field associated with the transformer 130 fully collapses, which may be referred to as demagnetization of the transformer 130. At the point of demagnetization, the diode 172 is again reversed biased, and the load 178 is provided power by way of the output capacitor 174 until the next discharge mode.

At the point in time when the field fully collapses, various capacitances and inductances within the power converter 100 begin to resonate. For example, the leakage inductance of the transformer 130 begins to resonate with the parasitic capacitance of the primary FET 140. Thus, after demagnetization, the voltage at the switch node 138 begins to oscillate. The oscillating voltage at the switch node 138 is reflected on the auxiliary winding 136. When the example power converter 100 operates in a quasi-resonant operation, the controller 190 observes the oscillations in some form (e.g., by way of the ZCD terminal 198, or by a separate connection to the switch node 138 (not specifically shown)), and makes the primary FET 140 conductive again in a valley of the oscillation. Activating the primary FET 140 in the valley of the oscillation reduces the voltage across the primary FET 140, which reduces switching losses and increases efficiency. Depending on the magnitude of the power provided to the load 178, the controller 190 may select any suitable valley of the oscillation (e.g., the first valley for higher loads, the sixth valley for lower loads).

Figure 2:
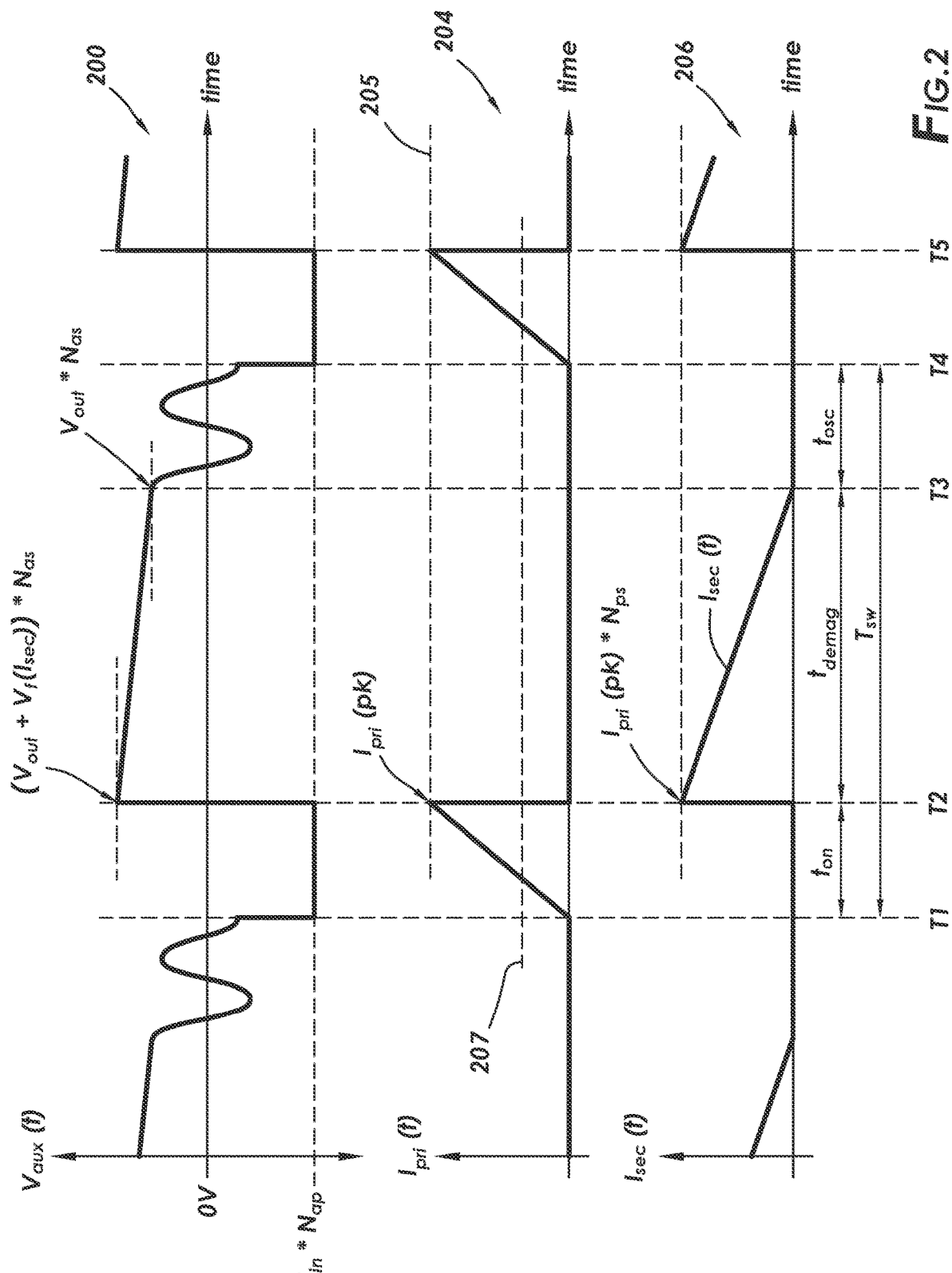
FIG. 2 shows a series signals of a power converter operating in a discontinuous conduction mode, and in accordance with at least some embodiments.

FIG. 2 shows a series of signals with the example power converter operating in a discontinuous conduction mode, and specifically quasi-resonant operation. In particular, plot 200 shows voltage on the auxiliary winding 136 as a function of time, plot 204 shows current through the primary winding 132 as a function of corresponding time, and plot 206 shows current through the secondary winding 134 as a function of corresponding time. FIG. 2 shows a complete switching period $T_{SW}$ between times T1 and T4, as well as portions of a previous switching period (e.g., before time T1) and portions of a subsequent switching period (e.g., after time T4). The example charge mode begins at time T1 and extends to time T2, being the on-time $t_{ON}$. During the charge mode, current ramps up in the primary winding 132 as shown by plot 204. As the current is ramping in the primary winding 132, the voltage on the auxiliary winding 136 is negative, and has a magnitude being the negative of the input voltage $V_{IN}$ times the turns ratio of the auxiliary winding to the primary winding $N_{ap}$. Further during the charge mode, because of the flyback arrangement, no current flows in the secondary winding 134 as shown by plot 206. When the current in the primary winding 132 reaches the current setpoint (designated $I_{pri}(pk)$ in the figure), the primary FET 140 is made non-conductive, and the current in the primary winding 132 drops to zero as shown in plot 204. Thus begins the discharge mode.

The example discharge mode begins at time T2, and for purposes of this specification and the claims extends until the immediately subsequent charge mode, which in the example of FIG. 2 begins at time T4. The discharge mode may be conceptually divided into a time duration to reach demagnetization of the transformer 130 between times T2 and T3, designated $t_{demag}$ in the figure, and a further time duration within which the switch node 138 is oscillating, designated $t_{OSC}$ in the figure, as shown in plot 200 by the voltage on the auxiliary winding 136 between times T3 and T4. In the example shown, the immediately subsequent charge mode begins in the second valley of the oscillation, but the charge mode may begin at any suitable valley in quasi-resonant operation.

During the discharge mode, the current in the secondary winding 134 jumps to an initial current having a magnitude being about equal to the peak current in the charge mode multiplied by the turns ratio of the primary winding to the secondary winding $N_{ps}$. The secondary current ramps down as shown in plot 206, and reaches zero at the time T3 being the demagnetization event. Further as shown in plot 206, the current through the secondary winding remains effectively zero until the next discharge mode begins at time T4.

Still referring to FIG. 2, and particularly plot 200. Certain values may be determined or derived from the voltage on the auxiliary winding 136 as sensed by the controller 190. In particular, in example cases the controller 190 may read a value or signal indicative of output voltage by way of the auxiliary winding 136. At time T2 being the beginning of the discharge mode, the voltage on the auxiliary winding 136 initially jumps to a value being the sum the output voltage $V_{OUT}$ and a voltage proportional to the current flow in the secondary winding (designated $V_f(I_{sec})$ in the figure) multiplied by the turns ratio of the auxiliary winding to the second winding $N_{as}$. However, at the instant in time that the current through the secondary winding reaches zero at time T3, the voltage on the auxiliary winding 136 drops to the output voltage $V_{OUT}$ multiplied by the turns ratio $N_{as}$. Thus, the controller 190 may read a signal indicative of output voltage by sampling the voltage induced on the auxiliary winding 136 at the instant that the current in the secondary winding 134 reaches zero. Stated otherwise, the controller 190 may determine a signal indicative of output voltage by sampling the voltage of the auxiliary winding 136 just before demagnetization.

The specification now turns to changes in operation of the power converter 100 as a function of power provided to the load. At full load power in quasi-resonant operation, the transformer 130 demagnetizes before the next charge mode begins, and the next charge mode begins in the first valley of the switch node 138. As the power provided to the load continues to decrease, each charge mode may begin in later valleys of the oscillation (e.g., the second valley, the sixth valley). In addition to selecting later valleys to begin the charge modes, the current setpoint for each charge mode may likewise drop to help regulate the energy provided to the secondary side 104.

As the power provided to load continues to decrease, and the current setpoint for each charge mode continues to decrease, the example power converter 100 may enter frequency foldback operation. The example controller 190 implements the foldback threshold when the current setpoint (e.g., shown by line 205) falls below the foldback threshold (e.g., shown by line 207). In frequency foldback operation, each charge mode begins after the demagnetization event but with a delay time longer than implemented when selecting valleys in quasi-resonant operation. The delay time may be variable based on the magnitude of the power provided to the load, and the delay time may result in the next charge mode beginning at a point in time that is not necessarily aligned with a valley in the oscillation at the switch node 138. Implementing a delay time after demagnetization lowers the switching frequency of the converter. The delay time may continue to increase, and thus the switching frequency may continue to decrease, until the switching frequency falls to a predetermined lower limit (e.g., 25 kiloHertz).

Thus, as the load continues to decrease, the current setpoint for each charge mode decreases, and correspondingly each discharge mode has a shorter and shorter duration. In power converters using related-art controllers performing primary-side regulation, in light load situations the time duration of each discharge mode may be too short for the controller to take an accurate sample of the voltage on the auxiliary winding. For example, related-art controllers may be unable to sample the voltage on the auxiliary winding, as an indication of output voltage $V_{OUT}$, when the discharge modes are about 460 ns or less. The shortcomings of the related-art are addressed, at least in part, by controller 190 implementing a sampling system and method that enables sampling the voltage on the auxiliary winding when the discharge modes are 460 ns or less, in some cases 250 ns or less, and in other cases as short as about 125 ns.

Figure 3:
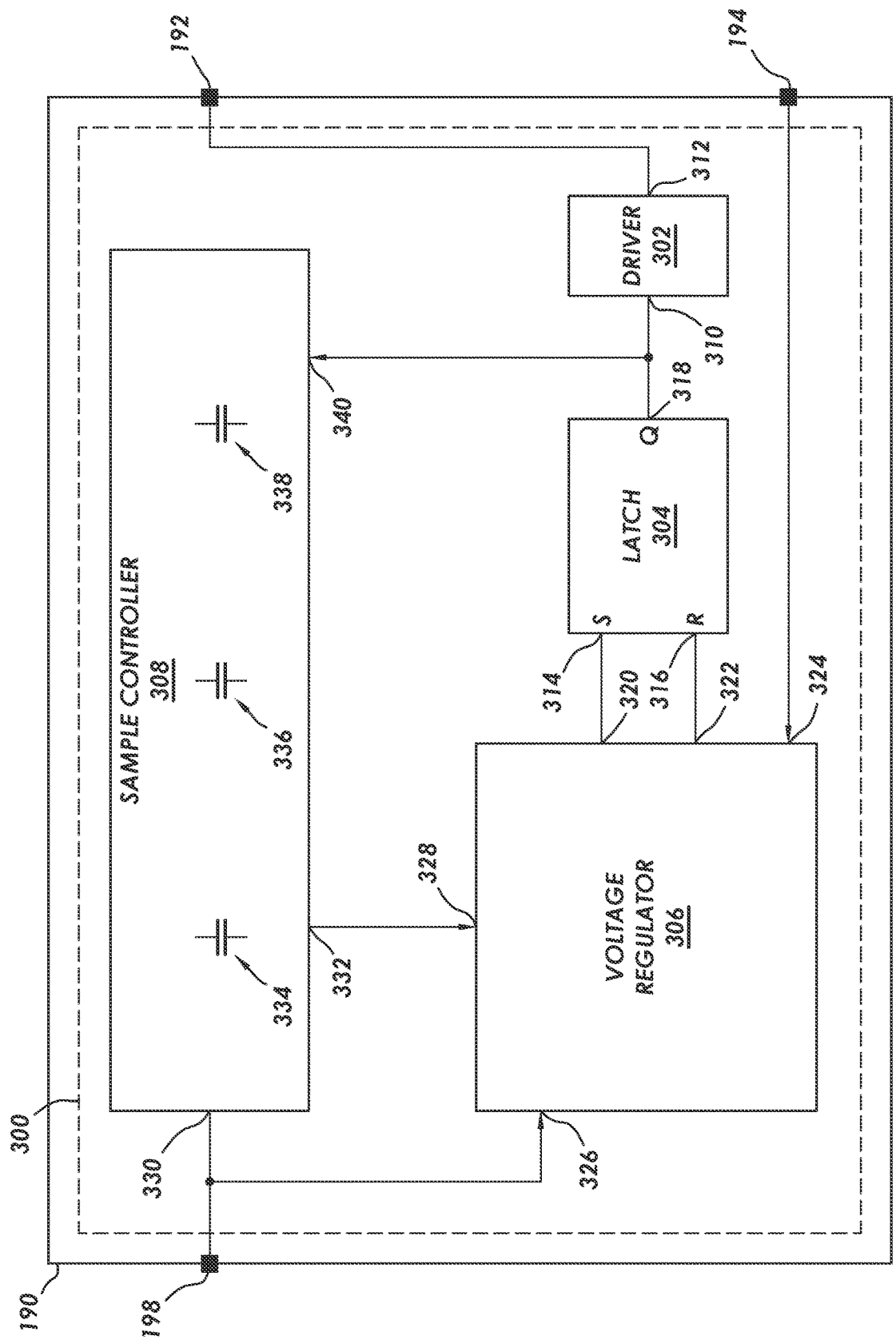
FIG. 3 shows a block diagram of primary-side controller, in accordance with at least some embodiments.

FIG. 3 shows a block diagram of the example controller 190. The electrical devices of the controller 190 may be monolithically created on one more substrates and encapsulated within packaging to form a packaged-semiconductor product or packaged-semiconductor device. For example, the controller 190 may be constructed on a substrate 300, such as silicon. The substrate 300 may be electrically coupled to terminals of the packaging, such as by lead wires. In other cases, the controller 190 may comprise two or more substrates coupled to each other and co-packaged (e.g., multi-chip module). The various terminals may be electrical connections or pins accessible on the outside surface of the packaging.

In particular, the controller 190 of FIG. 3 comprises the ZCD terminal 198, the drive terminal 192, and the CS terminal 194. Additional terminals will be present, such as Vcc terminal used to supply power to the controller 190, a ground terminal, and in some cases a high-voltage terminal coupled to the input voltage $V_{IN}$, but such additional terminals are not shown so as not to unduly complicate the figure and the discussion. Internally, the example controller 190 comprises a driver 302, a latch 304, a voltage regulator 306, and a sample controller 308. Each will be addressed in turn.

The driver 302 defines a drive input 310 and a drive output 312 coupled to the drive terminal 192. The driver 302 is designed and constructed to, responsive to assertion of the drive input 310, supply voltage and current to the drive output 312 sufficient to drive the gate of the primary FET 140. That is, when the drive input 310 is asserted, the driver 302 drives the gate of the primary FET 140 to make the primary FET 140 fully conductive. And when the drive input 310 is de-asserted, the driver 302 removes the voltage and current from the gate of the primary FET 140, such as by grounding the drive terminal 192.

The example latch 304 defines a set input 314, a reset input 316, and drive output 318 coupled to the drive input 310 of the driver 302. Thus, the example latch 304 is shown as a set-reset latch, but any suitable latching circuit may be used. When the set input 314 is asserted, the latch 304 asserts the drive output 318, which makes the primary FET 140 conductive and beginning a charge mode of the power converter 100. After assertion of the set input 314, the drive output 318 remains asserted even if the set input 314 thereafter goes de-asserted. When the reset input 316 is asserted, the latch 304 de-asserts the drive output 318, thus making the primary FET 140 non-conductive, ending the charge mode, and beginning the discharge mode of the power converter 100.

Still referring to FIG. 3, the example controller 190 further comprises the voltage regulator 306. The voltage regulator 306 defines a set output 320 coupled to the set input 314, a reset output 322 coupled to the reset input 316, a current-sense input 324 coupled to the CS terminal 194, a valley-detect input 326, and a valley-detect input 326. The voltage regulator 306 uses the signal on the feedback input 328 as an indication of the output voltage $V_{OUT}$. The voltage regulator 306 may perform any suitable control (e.g., current-mode control, or voltage-mode control) based on the feedback signal. When implementing current-mode control, the example voltage regulator 306 may sense current in the primary winding 132 during each charge mode by way of the current-sense input 324. The voltage regulator 306 may be designed and constructed to sense voltage valleys on the switch node 138 by way of the valley-detect input 326 coupled to the ZCD terminal 198. Based on the various inputs, the voltage regulator 306 is designed and constructed to periodically assert the drive terminal 192 by assertion of the set output 320 to cause charge modes, and to end each charge mode by assertion of the reset output 322 based on the feedback signal received on the feedback input 328.

The sample controller 308 defines a ZCD input 330 coupled to the ZCD terminal 198, a feedback output 332 coupled to the feedback input 328, a first capacitor 334, a second capacitor 336, a third capacitor 338, and drive input 340 coupled to the drive output 318 of the latch 304. The capacitors 334, 336, and 338 are shown unconnected in FIG. 3 for purposes of initial explanation. An example circuit to implement the operation is discussed in greater detail below. In particular, the sample controller 308 is designed and constructed to, during a first switching period of a drive signal applied to the drive terminal 192, supply the feedback signal to the voltage regulator 306 by the first capacitor 334, sample a voltage on the ZCD terminal 198 with the second capacitor 336, and pre-charge the third capacitor 338. That is, during the example first switching period, the first capacitor 334 stores a voltage indicative of the output voltage $V_{OUT}$ as sampled in a previous switching cycle, in some cases the immediately previous switching cycle. Thus, during the example first switching period the voltage on the first capacitor 334 is coupled to the feedback output 332.

Still during the example first switching period, the sample controller 308 samples the voltage on the ZCD terminal 198 during the discharge mode, and places or drives the sampled voltage on the second capacitor 336. The sampled voltage may be the voltage on the ZCD terminal 198 just prior to demagnetization of the transformer 130. Stated otherwise, the sampled voltage may be a signal indicative of the output voltage $V_{OUT}$ in the current switching period.

Further still during the example first switching period, the sample controller 308 is designed and constructed to reset or drain any voltage held on the third capacitor 338, and then pre-charge the third capacitor 338 with a voltage above zero but below an expected sample voltage. For example, the sample controller 308 may pre-charge the third capacitor 338 with a voltage being about 70% of an expected sample voltage, in some cases about 80% of the expected sample voltage, and in a particular case about 90% of the expected sample voltage.

Now turning to a second switching period. The controller 190 is designed and constructed to, during the second switching period of the drive signal applied to the drive terminal 192, supply the feedback signal to the voltage regulator 306 by way of the second capacitor 336, sample a voltage on the ZCD terminal 198 with the third capacitor 338, and reset and pre-charge the first capacitor 334. It follows that, during the second switching period, the voltage regulator 306 performs the regulation based on the signal indicative of output voltage $V_{OUT}$ sampled in the first switching period. The voltage sampled by the third capacitor 338 may be the voltage on the ZCD terminal 198 just prior to demagnetization of the transformer 130, thus deriving a signal indicative of the output voltage $V_{OUT}$. Further, the sample controller 308 may reset and pre-charge the first capacitor 334 with a voltage being about 70% of an expected sample voltage, in some cases about 80% of the expected sample voltage, and in a particular case about 90% of the expected sample voltage.

Now turning to a third switching period. The controller 190 is designed and constructed to, during the third switching period of the drive signal applied to the drive terminal 192, supply the feedback signal to the voltage regulator 306 by way of the third capacitor 338, sample a voltage on the ZCD terminal 198 with the first capacitor 334, and reset and pre-charge the second capacitor 336. It follows that, during the third switching period, the voltage regulator 306 performs the regulation based on the signal indicative of output voltage $V_{OUT}$ sampled in the second switching period. The voltage sampled by the first capacitor 336 may be the voltage on the ZCD terminal 198 just prior to demagnetization of the transformer 130, thus deriving a signal indicative of the output voltage $V_{OUT}$. Further, the sample controller 308 may reset and pre-charge the second capacitor 336 with a voltage being about 70% of an expected sample voltage, in some cases about 80% of the expected sample voltage, and in a particular case about 90% of the expected sample voltage.

Thereafter in a fourth switching period, the cycle repeats by supplying the feedback signal to the voltage regulator 306 by way of the first capacitor 334, sampling a voltage on the ZCD terminal 198 with the second capacitor 336, and resetting and pre-charging the third capacitor 338.

Using three capacitors to perform the sample and hold of the signal indicative of output voltage enables the controller 190 to sample shorter discharge modes than related-art controllers. More particularly, separating the reset function from the sample function, and pre-charging the capacitor prior to sampling, enables the controller 190 to sample shorter discharge mode than related-art controllers, and thus enables the controller 190 to regulate voltage in lower load situations. Moreover, separating the reset function from the sample function, and pre-charging the capacitor prior to sampling, enables the power converter to operate without a dummy load for low load operation. Stated otherwise, the power converter 100 may omit a dummy load in the form of a resistor parallel to the output capacitor 174 used by related-art controllers to ensure that the time duration of the discharge modes are long enough to sample the voltage by systems implementing primary-side regulation.

Figure 4:
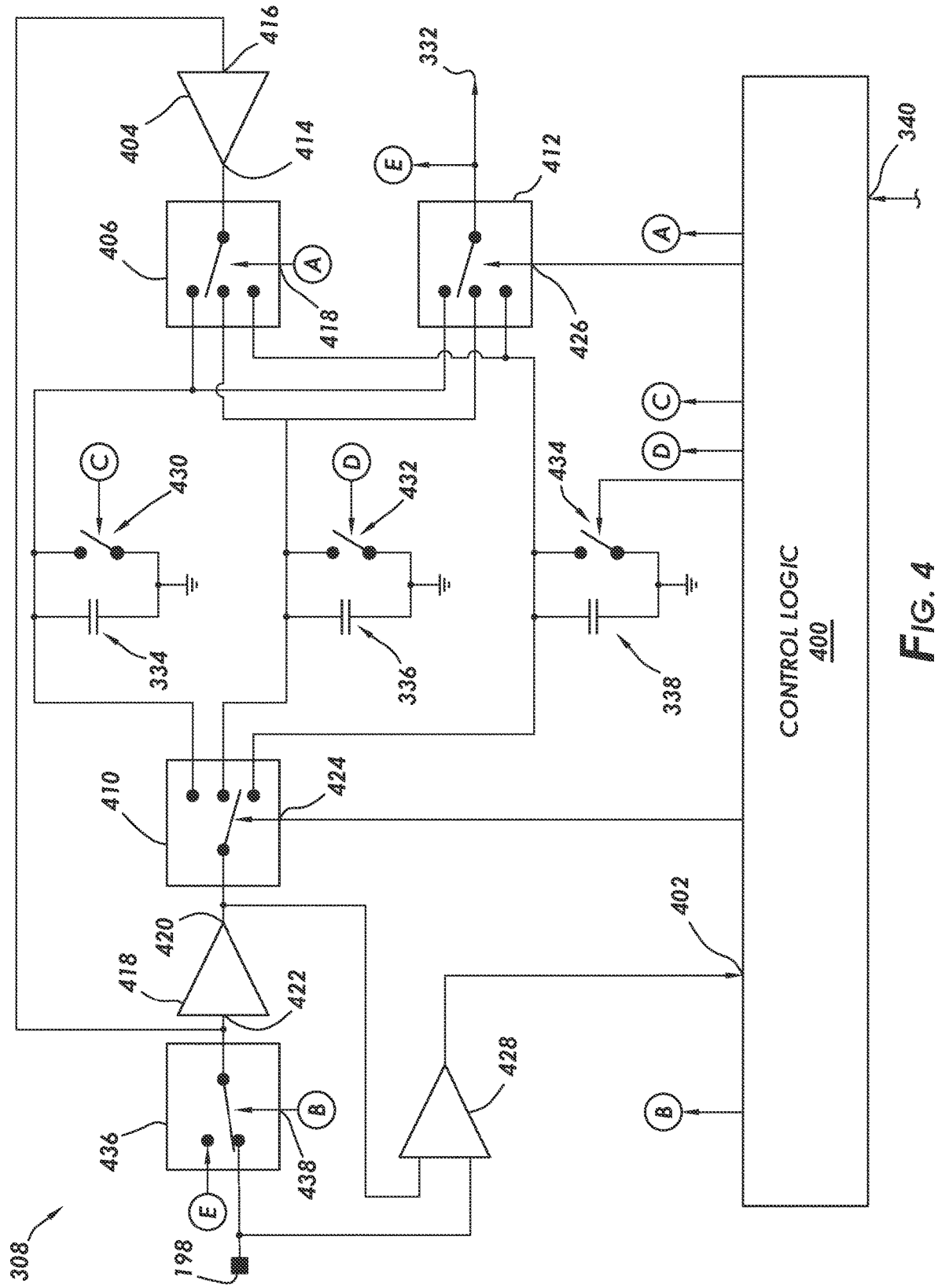
FIG. 4 shows a partial block diagram, partial electrical schematic, of a sample controller, in accordance with at least some embodiments.

FIG. 4 shows a partial block diagram, partial electrical schematic, of a sample controller 308 in accordance with at least some embodiments. In particular, visible in a column in the middle of the figure are the three example capacitors 334, 336 and 338. The sample controller 308 comprises several electrically-controlled switches to direct various signals. The switches are shown as mechanical switches for convenience of the drawings, but in practice the switches are constructed of one more transistors (e.g., one or more FETs). The various switches, and the timing for controlling the switches, are controlled by a control logic 400. In particular, the control logic 400 receives the drive signal by way of the drive input 340, and thus the control logic 400 is provided information regarding each charge mode of each switching cycle. Moreover, the control logic 400 defines a demagnetization input 402, such that the control logic receives an indication of the end of each discharge mode. Using these signal, the control logic 400 is designed and constructed to drive the control inputs of the various switches (e.g., control the gates of the FETs) to implement the rotating sample system and method.

In particular, the sample controller 308 defines a pre-charge amplifier 404, a pre-charge switch 406, a sample amplifier 408, a sample switch 410, and a feedback switch 412. The example pre-charge amplifier 404 defines a pre-charge output 414 coupled to the pre-charge switch 406, and a pre-charge input 416. In one example case, the pre-charge amplifier 404 is an operational amplifier designed and constructed to pre-charge an attached capacitor to a voltage value below the expected sample value. For now, consider that the pre-charge input 416 is coupled to the ZCD terminal 198, and thus the pre-charge amplifier 404 drives a voltage to the pre-charge output 414 that is a predetermined percentage of the voltage on the ZCD terminal 198. The various input and feedback resistors used to arrange the pre-charge amplifier 404 to follow the voltage on the ZCD terminal 198 are not shown so as not to unduly complicate the figure; however, one having ordinary skill, with the benefit of this disclosure, could design an operational amplifier to perform the recited pre-charging tasks.

The example pre-charge switch 406 defines a common or pole input coupled to the pre-charge output 414, and three leads or terminals coupled to the first capacitor 334, the second capacitor 336, and the third capacitor 338, respectively. Thus, the pre-charge switch 406 is configured to selectively couple the pre-charge output 414 to the first, second, or third capacitors 334, 336, or 338. The example pre-charge switch 406 defines a control input 418 coupled to the control logic 400, as shown by bubble "A". While the control input 418 is shown as a single connection, in systems in which the pre-charge switch 406 is implemented as three transistors, the control logic 400 may individually control the transistors to implement the switching and to avoid cross-conduction between the capacitors 334, 336, and 338.

Still referring to FIG. 4, the example sample controller 308 further includes the sample amplifier 408 and the sample switch 410. The sample amplifier 408 defines a sample output 420 coupled to the sample switch 410, and a sample input 422. In one example, the sample amplifier 408 is precision amplifier that can control its output to a high degree of precision, such as an operational transconductance amplifier (OTA). For now, consider that the sample input 422 is coupled directly to the ZCD terminal 198, and thus the sample amplifier 408 drives a voltage and/or current to the sample output 420 that matches, to a high degree of precision, the signal applied to the sample input 422. The various input and feedback resistors used to arrange the sample amplifier 408 to very closely reproduce the voltage on the ZCD terminal 198 are not shown so as not to unduly complicate the figure; however, one having ordinary skill, with the benefit of this disclosure, could design a precision amplifier to perform the sampling tasks. It is noted that, in being a high precision amplifier, the sample amplifier 408 may be relatively slow to settle at the sampled value, hence the reason the sample controller 308 uses the pre-charge amplifier 404 to pre-charge the capacitor to which the sample is later driven by the sample amplifier 408.

The sample switch 410 defines a common or pole input coupled to the sample output 420, and three leads or terminals coupled to the first capacitor 334, the second capacitor 336, and the third capacitor 338, respectively. Thus, the sample switch 410 is configured to selectively couple the sample output 420 to the first, second, or third capacitors 334, 336, or 338. The sample switch 410 defines a control input 424 coupled to the control logic 400. While the control input 424 is shown as a single connection, in systems in which sample switch 410 is implemented as three transistors, the control logic 400 may individually control the transistors to implement the switching and to avoid cross-conduction between the capacitors 334, 336, and 338.

Still referring to FIG. 4, the sample controller 308 further incudes the feedback switch 412. The feedback switch 412 defines a common or pole output that defines the feedback output 332 for the sample controller 308, and three leads or terminals coupled to the first capacitor 334, the second capacitor 336, and the third capacitor 338, respectively. Thus, the feedback switch 412 is configured to selectively couple the first, second, or third capacitors 334, 336, or 338 to the feedback output 332. The example feedback switch 412 defines a control input 426 coupled to the control logic 400. While the control input 426 is shown as a single connection, in systems in which feedback switch 412 is implemented as three transistors, the control logic 400 may individually control the transistors to implement the switching and to avoid cross-conduction between the capacitors 334, 336, and 338.

The sample controller 308 further includes a comparator 428 defining a first input coupled to the ZCD terminal 198, a second input coupled to the sample output 420, and a compare output coupled to the demagnetization input 402 of the control logic 400. During each switching period, the comparator 428 asserts the compare output when the voltage on the ZCD terminal 198 falls below the signal on the sample output 420 of the sample amplifier 408 (e.g., just after time T3 of FIG. 2). That is, the sample amplifier 408, being a precision amplifier, may have relatively slow response time to quickly varying signals. At the end of each discharge mode when the transformer 130 is demagnetized, the voltage at the ZCD terminal 198 quickly drops as part of the oscillation at the switch node 138, and thus the comparator 428 asserts the demagnetization input 402 of the control logic 400 as an indication that demagnetization has taken place.

The sample controller 308 further includes shorting switches for each capacitor 334, 336, and 338. In particular, the sample controller 308 includes a shorting switch 430 coupled across the first capacitor 334, and a control input coupled to the control logic 400, as shown by bubble "C". Just prior to pre-charging the first capacitor 430 by the pre-charge amplifier 404, the control logic 400 momentarily makes the shorting switch 430 conductive to drain the current from the first capacitor 334. Similarly, the sample controller 308 includes shorting switch 432 coupled across the second capacitor 336, and a control input coupled to the control logic 400, as shown by bubble "D". Just prior to pre-charging the second capacitor 336 by the pre-charge amplifier 404, the control logic 400 momentarily makes the shorting switch 432 conductive to drain the current from the second capacitor 336. Finally, the sample controller 308 includes shorting switch 434 coupled across the third capacitor 338, and a control input coupled to the control logic 400. Just prior to pre-charging the third capacitor 338 by the pre-charge amplifier 404, the control logic 400 momentarily makes the shorting switch 434 conductive to drain the current from the third capacitor 338.

The sample controller 308 is thus designed and constructed to, during a first switching period: arrange the feedback switch 412 to couple the first capacitor 334 to the feedback output; arrange the sample switch 410 to couple the second capacitor 336 to the sample amplifier 408; and momentarily short the third capacitor 338 by way of the shorting switch 434, and then arrange the pre-charge switch 406 to couple the third capacitor 338 to the pre-charge amplifier 404. The sample controller 308 is further designed and constructed to, during a second switching period: arrange the feedback switch 412 to couple the second capacitor 336 to the feedback output 332; arrange the sample switch 410 to couple the third capacitor 338 to the sample amplifier 408; and momentarily short the first capacitor 334, and then arrange the pre-charge switch 406 to couple the first capacitor 334 to the pre-charge amplifier 404. The sample controller 308 is further designed and constructed to, during a third switching period: arrange the feedback switch 412 to couple the third capacitor 338 to the feedback output 332; arrange the sample switch 410 to couple the first capacitor 334 to the sample amplifier 408; and momentarily short second capacitor 336, and then arrange the pre-charge switch 406 to couple the second capacitor 336 to the pre-charge amplifier 404.

In the examples discussed to this point, the sample input 422 of the sample amplifier 408 and the pre-charge input 416 of the pre-charge amplifier 404 are assumed to be connected to the ZCD terminal 198 at all relevant times. Such connections, in combination with the various amplifiers and switches, would be operable in many situations, and would enable the sample controller 308 to sample discharge modes of shorter duration than related-art systems implementing primary-side regulation. However, in yet still further examples the duration of discharged modes that may be sampled by the sample controller 308 may be further decreased by selective control of the input signals provided to the sample amplifier 408 and the pre-charge amplifier 404. In particular, in example systems the sample controller 308 may further comprise an input switch 436 that defines a common or pole input coupled to sample input 422 of the sample amplifier 408 and the pre-charge input 416 of the pre-charge amplifier 404. The example input switch 436 further defines two leads or terminals, one terminal coupled to the ZCD terminal 198, and a second terminal coupled to the feedback output 332, as shown by bubble "E". Thus, the input switch 436 is configured to selectively couple the inputs of the sample amplifier 408 and the pre-charge amplifier 404 to the ZCD terminal 198 or the feedback voltage. The example input switch 436 defines a control input 438 coupled to the control logic 400, as shown by bubble "B". While the control input 418 is shown as a single connection, in systems in which input switch 436 is implemented as two transistors, the control logic 400 may individually control the transistors to implement the switching and to avoid cross-conduction between the feedback output 332 and the ZCD terminal 198.

In various examples, the sample controller 308 operates the input switch 436 to avoid large signal changes applied to the sample amplifier 408 and the pre-charge amplifier 404. For example, during charge modes (e.g., between times T1 and T2 of FIG. 2), the sample controller 308 arranges the input switch 436 to couple the feedback output 332 to the sample amplifier 408 and the pre-charge amplifier 404. Thus, rather than coupling a negative voltage to the inputs of the sample amplifier 408 and the pre-charge amplifier 404, the feedback signal on the feedback output 332 is coupled to the amplifiers, which feedback signal more closely matches the sampled signal in the immediately subsequent discharge mode, rather than a negative voltage as shown in FIG. 2 or perhaps a clamped zero voltage if the sample controller 308 implements ZCD blanking. In this way, the sample amplifier 408 and the pre-charge amplifier 404 more quickly stabilize during each discharge mode.

Stated otherwise, nodes 422 and 416 see the value sampled in previous cycle available on the node 332 all the time except the period between T2 and T3. This period (T2-T3) provides the circuitry the valid signal. Outside this period, this circuitry does not need to see the ZCD waveform.

Thus, the sample controller 308 may be further designed and constructed to, during the first switching period: during a charge mode of the first switching period, arrange the input switch 436 to couple the feedback signal to the sample input 422 of the sample amplifier 408 and the pre-charge input 416 of the pre-charge amplifier 404; and during a discharge mode of the first switching period, arrange the input switch 436 to couple the ZCD terminal 198 to the sample input 422 of the sample amplifier 408 and the pre-charge input 416 of the pre-charge amplifier 404. The sample controller may be further designed and constructed to, during the second switching period: during a charge mode of the second switching period, arrange the input switch 436 to couple the feedback signal to the sample input 422 of the sample amplifier 408 and the pre-charge input 416 of the pre-charge amplifier 404; and during a discharge mode of the second switching period, arrange the input switch 436 to couple the ZCD terminal 198 to the sample input 422 of the sample amplifier 408 and the pre-charge input 416 of the pre-charge amplifier 404. And finally, the sample controller 308 may be further configured to, during the third switching period: during a charge mode of the third switching period, arrange the input switch 436 to couple the feedback signal to the sample input 422 of the sample amplifier 408 and the pre-charge input 416 of the pre-charge amplifier 404; and during a discharge mode of the second switching period, arrange the input switch 436 to couple the ZCD terminal 198 to the sample input 422 of the sample amplifier 408 and the pre-charge input 416 of the pre-charge amplifier 404.

In the various examples, the first second and third switching periods are contiguous switch periods, but such is not strictly required. Moreover, during a fourth switching period, immediately subsequent to the third switching period, the cycle repeats, and thus the first and fourth switching periods may operate identically, the second and fifth switching periods may operate identically, and so on.

Figure 5:
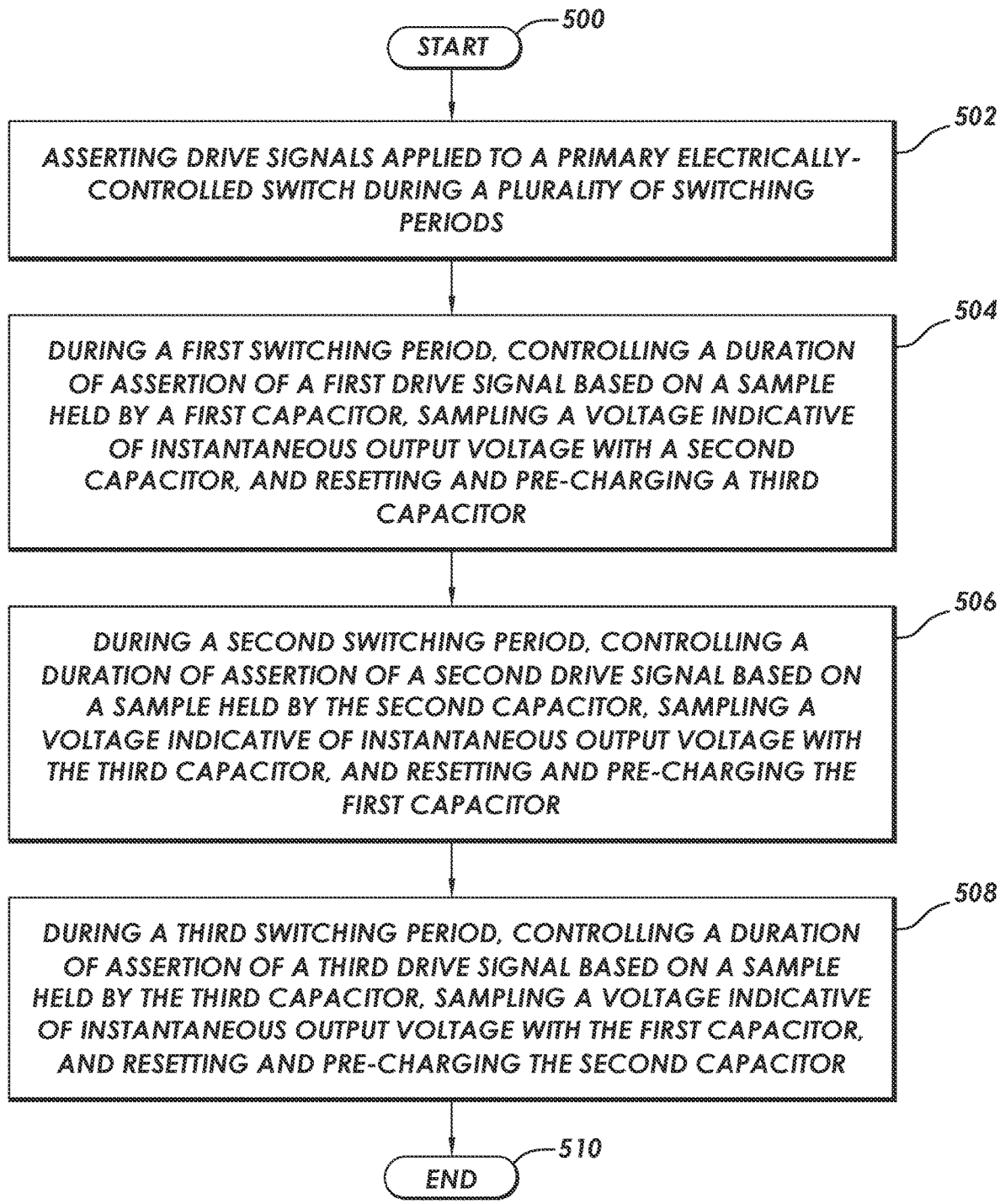
FIG. 5 shows a method in accordance with at least some embodiments.

FIG. 5 shows an example method of controlling a switching power converter. In particular, the method starts (block 500) and comprises: asserting drive signals applied to a primary electrically-controlled switch during a plurality of switching periods (block 502); during a first switching period, controlling a duration of assertion of a first drive signal based on a sample held by a first capacitor, sampling a voltage indicative of instantaneous output voltage with a second capacitor, and resetting and pre-charging a third capacitor (block 504); during a second switching period, controlling a duration of assertion of a second drive signal based on a sample held by the second capacitor, sampling a voltage indicative of instantaneous output voltage with the third capacitor, and resetting and pre-charging the first capacitor (block 506); and during a third switching period, controlling a duration of assertion of a third drive signal based on a sample held by the third capacitor, sampling a voltage indicative of instantaneous output voltage with the first capacitor, and resetting and pre-charging the second capacitor (block 508). Thereafter the method ends (block 510), likely to be repeated for further switching periods.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of controlling a switching power converter, the method comprising:
asserting drive signals applied to a primary electrically-controlled switch during a plurality of switching periods;
during a first switching period, controlling a duration of assertion of a first drive signal based on a sample held by a first capacitor, sampling a voltage indicative of instantaneous output voltage with a second capacitor, and pre-charging a third capacitor;
during a second switching period, controlling a duration of assertion of a second drive signal based on a sample held by the second capacitor, sampling a voltage indicative of instantaneous output voltage with the third capacitor, and pre-charging the first capacitor; and
during a third switching period, controlling a duration of assertion of a third drive signal based on a sample held by the third capacitor, sampling a voltage indicative of instantaneous output voltage with the first capacitor, and pre-charging the second capacitor.

2. The method of claim 1:
wherein sampling the voltage indicative of instantaneous output voltage during the first switching period further comprises driving the second capacitor with a sample amplifier; and
wherein pre-charging the third capacitor during the first switching period further comprises pre-charging with a pre-charge amplifier.

3. The method of claim 2:
wherein sampling the voltage indicative of instantaneous output voltage during the second switching period further comprises driving the third capacitor with the sample amplifier; and
wherein pre-charging the first capacitor during the second switching period further comprises pre-charging with the pre-charge amplifier.

4. The method of claim 3:
wherein sampling the voltage indicative of instantaneous output voltage during the third switching period further comprises driving the first capacitor with the sample amplifier; and
wherein pre-charging the second capacitor during the third switching period further comprises pre-charging with the pre-charge amplifier.

5. The method of claim 1 further comprising, during the first switching period:
during a charge mode of the first switching period, coupling the first capacitor to a sample input of a sample amplifier and a pre-charge input of a pre-charge amplifier; and
during a discharge mode of the first switching period, coupling the voltage indicative of instantaneous output voltage to the sample input of the sample amplifier and the pre-charge input of the pre-charge amplifier.

6. The method of claim 5 further comprising, during the second switching period:

during a charge mode of the second switching period, coupling the second capacitor to the sample input of the sample amplifier and the pre-charge input of the pre-charge amplifier; and during a discharge mode of the second switching period, coupling the voltage indicative of instantaneous output voltage to the sample input of the sample amplifier and the pre-charge input of the pre-charge amplifier.

7. The method of claim 6 further comprising, during the third switching period:

during a charge mode of the third switching period, coupling the third capacitor to the sample input of the sample amplifier and the pre-charge input of the pre-charge amplifier; and during a discharge mode of the third switching period, coupling the voltage indicative of instantaneous output voltage to the sample input of the sample amplifier and the pre-charge input of the pre-charge amplifier.

8. A primary-side controller for a switching power converter, the primary-side controller comprising:

a zero-current detection (ZCD) terminal and a drive terminal;

a driver coupled to the drive terminal and defining a drive input;

a latch defining a drive output coupled to drive input, a set input, and a reset input;

a voltage regulator defining a set output coupled to the set input, a reset output coupled to the reset input, and a feedback input, the voltage regulator configured to periodically assert the drive terminal by assertion of the set output to cause charge modes, and to end each charge mode by assertion of the reset output based on a feedback signal on the feedback input;

a sample controller comprising a first capacitor, a second capacitor, and a third capacitor, the sample controller coupled to the ZCD terminal and defining a feedback output, the sample controller configured to:

during a first switching period of a drive signal applied to the drive terminal, supply the feedback signal to the voltage regulator with the first capacitor, sample a voltage on the ZCD terminal with the second capacitor, and pre-charge the third capacitor;

during a second switching period of the drive signal applied to the drive terminal, supply the feedback signal to the voltage regulator with the second capacitor, sample a voltage on the ZCD terminal with the third capacitor, and pre-charge the first capacitor; and during a third switching period of the drive signal applied to the drive terminal, supply the feedback signal to the voltage regulator with the third capacitor, sample a voltage on the ZCD terminal with the first capacitor, and pre-charge the second capacitor.

9. The primary-side controller of claim 8 wherein the sample controller further comprises:

a pre-charge amplifier defining a pre-charge output;

a pre-charge switch configured to selectively couple the pre-charge output to the first, second, or third capacitor;

a sample amplifier defining a sample output;

a sample switch configured to selectively couple the sample output to the first, second, or third capacitor; and a feedback switch configured to selectively couple the first, second, or third capacitor to the feedback output;

the sample controller configured to, during the first switching period:

arrange the feedback switch to couple the first capacitor to the feedback output;

arrange the sample switch to couple the second capacitor to the sample amplifier; and arrange the pre-charge switch to couple the third capacitor to the pre-charge amplifier.

10. The primary-side controller of claim 9 wherein the sample controller is further configured to, during the second switching period:

arrange the feedback switch to couple the second capacitor to the feedback output;

arrange the sample switch to couple the third capacitor to the sample amplifier; and arrange the pre-charge switch to couple the first capacitor to the pre-charge amplifier.

11. The primary-side controller of claim 10 wherein the sample controller is further configured to, during the third switching period:

arrange the feedback switch to couple the third capacitor to the feedback output;

arrange the sample switch to couple the first capacitor to the sample amplifier; and arrange the pre-charge switch to couple the second capacitor to the pre-charge amplifier.

12. The primary-side controller of claim 8 wherein the sample controller further comprises:

a pre-charge amplifier defining a pre-charge input;

a sample amplifier defining a sample input;

an input switch configured to selectively couple the pre-charge input and the sample input to the feedback output or the ZCD terminal;

wherein the sample controller is further configured to, during the first switching period:

during a charge mode of the first switching period, arrange the input switch to couple the feedback signal to the sample input of the sample amplifier and the pre-charge input of the pre-charge amplifier; and during a discharge mode of the first switching period, arrange the input switch to couple the ZCD terminal to the sample input of the sample amplifier and the pre-charge input of the pre-charge amplifier.

13. The primary-side controller of claim 12 wherein the sample controller is further configured to, during the second switching period:

during a charge mode of the second switching period, arrange the input switch to couple the feedback signal to the sample input of the sample amplifier and the pre-charge input of the pre-charge amplifier; and during a discharge charge mode of the second switching period, arrange the input switch to couple the ZCD terminal to the sample input of the sample amplifier and the pre-charge input of the pre-charge amplifier.

14. The primary-side controller of claim 13 wherein the sample controller is further configured to, during the third switching period:

during a charge mode of the third switching period, arrange the input switch to couple the feedback signal to the sample input of the sample amplifier and the pre-charge input of the pre-charge amplifier; and during a discharge mode of the third switching period, arrange the input switch to couple the ZCD terminal to the sample input of the sample amplifier and the pre-charge input of the pre-charge amplifier.

15. The primary-side controller of claim 8 further comprising a current-sense terminal, and wherein the voltage regulator ends each charge mode based on the feedback signal on the feedback input and a current-sense signal on the current-sense terminal.

16. A switching power converter comprising:
a transformer having a primary winding defining a first terminal and a second terminal, a secondary winding defining third terminal and fourth terminal, and an auxiliary winding defining a fifth terminal and a sixth terminal, the first terminal coupled to an input voltage, the fourth terminal defining a secondary return, and the sixth terminal coupled to a reference voltage;
an electrically-controlled switch having a first lead coupled to the second terminal, a second lead coupled to the reference voltage, and a control input;
a secondary rectifier having a first lead coupled to the third terminal and a second lead defining an output voltage;
a controller coupled to the auxiliary winding and the control input of the electrically-controlled switch, the controller configured to:
assert the control input during a plurality of switching periods;
during a first switching period, control a duration of assertion of a first drive signal based on a sample held by a first capacitor, sample a voltage on the auxiliary winding with a second capacitor, and pre-charge a third capacitor;
during a second switching period, control a duration of assertion of a second drive signal based on a sample held by the second capacitor, sample a voltage on the auxiliary winding with the third capacitor, and pre-charge the first capacitor; and
during a third switching period, control a duration of assertion of a third drive signal based on a sample held by the third capacitor, sample a voltage on the auxiliary winding with the first capacitor, and pre-charge the second capacitor.

17. The switching power converter of claim 16:
wherein when the controller samples the voltage on the auxiliary winding during the first switching period, the controller is configured to drive the second capacitor with a sample amplifier; and
wherein when the controller pre-charges the third capacitor during the first switching period, the controller is configured to pre-charge with a pre-charge amplifier.

18. The switching power converter of claim 17:
wherein when the controller samples the voltage on the auxiliary winding during the second switching period, the controller is configured to drive the third capacitor with the sample amplifier; and
wherein when the controller pre-charges the first capacitor during the second switching period, the controller is configured to pre-charge with the pre-charge amplifier.

19. The switching power converter of claim 18:
wherein when the controller samples the voltage on the auxiliary winding during the third switching period, the controller is configured to drive the first capacitor with the sample amplifier; and
wherein when the controller pre-charges the second capacitor during the third switching period, the controller is configured to pre-charge with the pre-charge amplifier.

20. The switching power converter of claim 16:
wherein the controller is further configured to, during the first switching period:
couple, during a charge mode of the first switching period, the first capacitor to a sample input of a sample amplifier and a pre-charge input of a pre-charge amplifier; and
couple, during a discharge mode of the first switching period, the auxiliary winding to the sample input of the sample amplifier and the pre-charge input of the pre-charge amplifier;
wherein the controller is further configured to, during the second switching period:
couple, during a charge mode of the second switching period, the second capacitor to the sample input of the sample amplifier and the pre-charge input of the pre-charge amplifier; and
couple, during a discharge mode of the second switching period, the auxiliary winding to the sample input of the sample amplifier and the pre-charge input of the pre-charge amplifier;
wherein the controller is further configured to, during the third switching period:
couple, during a charge mode of the third switching period, the third capacitor to the sample input of the sample amplifier and the pre-charge input of the pre-charge amplifier; and
couple, during a discharge mode of the third switching period, the auxiliary winding to the sample input of the sample amplifier and the pre-charge input of the pre-charge amplifier.

* * * * *